US009445620B2

(12) United States Patent
Roth

(10) Patent No.: US 9,445,620 B2
(45) Date of Patent: *Sep. 20, 2016

(54) METHOD FOR TREATING MEAT PRODUCTS WITH CARBON MONOXIDE

(75) Inventor: Eldon Roth, Dakota Dunes, SD (US)

(73) Assignee: Freezing Machines, Inc., Dakota Dunes, SD (US)

(*) Notice: Subject to any disclaimer, the term of this patent is extended or adjusted under 35 U.S.C. 154(b) by 1754 days.

This patent is subject to a terminal disclaimer.

(21) Appl. No.: 11/502,841

(22) Filed: Aug. 11, 2006

(65) Prior Publication Data

US 2006/0286222 A1 Dec. 21, 2006

Related U.S. Application Data

(63) Continuation of application No. 10/795,000, filed on Mar. 5, 2004, now Pat. No. 7,094,435.

(51) Int. Cl.
| | |
|---|---|
| A23L 1/31 | (2006.01) |
| A23L 1/318 | (2006.01) |
| A23B 4/14 | (2006.01) |
| A23B 4/18 | (2006.01) |
| A23B 4/20 | (2006.01) |
| A23B 4/28 | (2006.01) |
| A23L 1/272 | (2006.01) |
| A23L 1/317 | (2006.01) |

(52) U.S. Cl.
CPC .............. *A23L 1/3187* (2013.01); *A23B 4/14* (2013.01); *A23B 4/18* (2013.01); *A23B 4/20* (2013.01); *A23B 4/28* (2013.01); *A23L 1/272* (2013.01); *A23L 1/317* (2013.01); *A23L 1/318* (2013.01); *A23L 1/3177* (2013.01)

(58) Field of Classification Search
CPC ..... A23L 1/317; A23L 1/3177; A23L 1/318; A23L 1/3187; A23B 4/00; A23B 4/28; A23B 4/20; A23B 4/14; A23B 4/18
USPC ............... 426/312, 265, 326, 263, 281, 319
See application file for complete search history.

(56) References Cited

U.S. PATENT DOCUMENTS

| | | | |
|---|---|---|---|
| 1,909,508 A | 5/1933 | Schick | |
| 2,942,986 A | 6/1960 | Williams | |
| 3,023,109 A | 2/1962 | Hines | |
| 3,119,696 A | 1/1964 | Williams | |
| 3,387,979 A | 6/1968 | Farha | |
| 3,930,040 A | 12/1975 | Woodruff | |
| 4,001,446 A * | 1/1977 | Hood | 426/250 |
| 4,089,983 A | 5/1978 | Hood | |
| 4,211,160 A | 7/1980 | Bieser | |
| 4,220,669 A | 9/1980 | Townsend | |
| 4,292,889 A | 10/1981 | Townsend | |
| 4,522,835 A * | 6/1985 | Woodruff et al. | 426/264 |
| 4,594,253 A | 6/1986 | Fradin | |
| 5,012,728 A | 5/1991 | Langen et al. | |
| 5,059,152 A | 10/1991 | Barber, III | |
| 5,433,142 A * | 7/1995 | Roth | 99/474 |
| 5,489,443 A | 2/1996 | Knipe et al. | |
| 5,507,221 A | 4/1996 | Lagares-Corominas | |
| 5,609,520 A | 3/1997 | Stewart | |
| 5,638,744 A | 6/1997 | Smith | |
| 5,664,488 A | 9/1997 | Smith | |
| 5,773,060 A | 6/1998 | Smith | |
| 5,871,795 A | 2/1999 | Roth | |
| 5,948,123 A | 9/1999 | Hirata et al. | |
| 6,042,859 A | 3/2000 | Shaklai | |
| 6,113,962 A | 9/2000 | Spencer | |
| 6,142,067 A | 11/2000 | Roth | |
| 6,270,829 B1 | 8/2001 | Shaklai | |
| 6,379,728 B1 | 4/2002 | Roth | |
| 6,387,426 B1 | 5/2002 | Roth | |
| 6,389,838 B1 | 5/2002 | Roth | |
| 6,406,728 B1 | 6/2002 | Roth | |
| 6,521,275 B1 | 2/2003 | Mercogliano et al. | |

(Continued)

FOREIGN PATENT DOCUMENTS

| | | |
|---|---|---|
| EP | 1 444 899 A1 | 8/2004 |
| EP | 1444899 A1 * | 8/2004 |

(Continued)

OTHER PUBLICATIONS http://www.jtbaker.com/msds/englishhtml/A5916.htm, Ammonium hydroxide, Date Aug. 15, 2004, Total p. 9. Date verification from http://web.archive.org.*
http://www.atsdr.cdc.gov/toxprofiles/tp126-c4.pdf ,"Ammonia" Chemical and Physical information, Date Oct. 21, 2004 pp. 107-110.Date verification from http://web.archive.org, Total pp. 5.*
Communication pursuant to Article 153(7) EPC dated Jan. 22, 2008 (European Application No. 05724391.7-2114)(3 Pages).

(Continued)

*Primary Examiner* — Jyoti Chawla
(74) *Attorney, Agent, or Firm* — Russell D. Culbertson; The Culbertson Group, P.C.

(57) ABSTRACT

Carbon monoxide is injected into the interior of the meat product along with one or more pH modifying materials to produce a desired carbon monoxide saturation level. The amount of carbon monoxide in the added fluid is controlled to produce a desired carbon monoxide saturation level distributed substantially evenly throughout the treated volume of the meat product. This desired saturation level may vary depending upon the nature of the meat product being treated, however, the saturation level will generally remain at less than 100% or complete saturation for most meat products. The pH modifying material is injected into the interior of the meat product either simultaneously with the carbon monoxide, or as a pre-treatment before application of carbon monoxide, or as a post-treatment after the application of carbon monoxide.

19 Claims, 4 Drawing Sheets

(56) References Cited

U.S. PATENT DOCUMENTS

| | | |
|---|---|---|
| 6,564,700 B2 | 5/2003 | Roth |
| 6,565,904 B2 | 5/2003 | Roth |
| 6,713,108 B2 | 3/2004 | Roth |
| 6,899,908 B2 | 5/2005 | Roth |
| 7,004,065 B2 | 2/2006 | Roth |
| 7,022,361 B2 | 4/2006 | Roth |
| 7,094,435 B2 | 8/2006 | Roth |
| 7,214,398 B2 | 5/2007 | Roth |
| 7,781,004 B2 | 8/2010 | Roth |
| 2002/0015777 A1* | 2/2002 | Roth .......................... 426/645 |
| 2002/0127314 A1* | 9/2002 | Roth .......................... 426/319 |
| 2002/0150659 A1 | 10/2002 | Roth |
| 2003/0017252 A1 | 1/2003 | Roth |
| 2003/0044497 A1* | 3/2003 | Kowalski .................. 426/315 |
| 2004/0071822 A1 | 4/2004 | Roth |
| 2004/0241296 A1 | 12/2004 | Roth |
| 2004/0247769 A1 | 12/2004 | Victoria et al. |
| 2006/0141109 A1 | 6/2006 | Roth |
| 2006/0286222 A1 | 12/2006 | Roth |
| 2006/0292272 A1 | 12/2006 | Roth |
| 2007/0014901 A1 | 1/2007 | Roth |
| 2008/0057165 A1 | 3/2008 | Roth |
| 2008/0124436 A1 | 5/2008 | Roth et al. |
| 2010/0159087 A1 | 6/2010 | Roth et al. |

FOREIGN PATENT DOCUMENTS

| | | | |
|---|---|---|---|
| JP | 58047429 A | | 3/1983 |
| JP | 61-135552 | | 6/1986 |
| JP | 6439965 | | 2/1989 |
| JP | 03004737 A | * | 1/1991 |
| SU | 2081186/13 | | 12/1976 |

OTHER PUBLICATIONS

International Search Report (PCT Article 18 and Rules 43 and 44) dated Dec. 1, 2004, (PCT Application No. PCT/US03/39008) (2 pages).
International Search Report (PCT Article 18 and Rules 43 and 44) dated Nov. 12, 2004, (PCT Application No. PCT/US03/32278) (3 pages).
AIPO, Examiner's First Report dated May 12, 2011, in corresponding Australian application No. 2006315883 (4 pages).
NZIPO, Examination Report dated Mar. 29, 2010, in corresponding New Zealand application No. 568022 (2 pages).
NZIPO, Examination Report dated May 10, 2011, in corresponding New Zealand application No. 568022 (2 pages).
USPTO, Office Action Summary dated Mar. 4, 2009, in U.S. Appl. No. 11/510,418 (19 pages).
USPTO, Office Action Summary dated Jan. 6, 2010, in U.S. Appl. No. 11/927,496 (14 pages).
USPTO, Office Action Summary dated Sep. 10, 2010, in U.S. Appl. No. 11/927,496 (9 pages).
USPTO, Office Action Summary dated Apr. 28, 2011, in U.S. Appl. No. 11/927,496 (12 pages).
USPTO, Office Action Summary dated Mar. 17, 2009, in U.S. Appl. No. 11/405,058 (25 pages).
USPTO, Office Action Summary dated Oct. 1, 2009, in U.S. Appl. No. 11/405,058 (10 pages).
USPTO, Office Action Summary dated Jan. 15, 2010, in U.S. Appl. No. 11/405,058 (9 pages).
USPTO, Office Action Summary dated Oct. 5, 2010, in U.S. Appl. No. 11/405,058 (15 pages).
International Search Report dated May 8, 2007, in PCT application No. PCT/US2006/41405 (3 pages).
Written Opinion of the International Search Authority dated May 8, 2007, in PCT application No. PCT/US2006/41405 (3 pages).
http://www.chemistryexplained.com/Ru-Sp/Solution-Chemistry.html, Solution Chemistry, date retrieved Apr. 18, 2011 (4 pages).
Applicant's Response to Office Action filed Jul. 6, 2010, in U.S. Appl. No. 11/927,496 (9 pages).
Applicant's Response to Office Action filed Mar. 10, 2011, in U.S. Appl. No. 11/927,496 (6 pages).
Applicant's Response to Office Action filed Jul. 17, 2009, in U.S. Appl. No. 11/405,058 (17 pages).
Applicant's Response to Office Action filed Jan. 4, 2010, in U.S. Appl. No. 11/405,058 (16 pages).
Applicant's Response to Office Action filed Jul. 15, 2010, in U.S. Appl. No. 11/405,058 (17 pages).
USPTO, Office Action Summary dated Mar. 5, 2009, in U.S. Appl. No. 11/510,357 (21 pages).
Applicant's Response to Office Action filed Sep. 8, 2009 in U.S. Appl. No. 11/510,357 (15 pages).
USPTO, Office Action Summary dated Jan. 12, 2010, in U.S. Appl. No. 11/510,357 (9 pages).
Applicant's Response to Office Action filed Jul. 12, 2010, in U.S. Appl. No. 11/510,357 (14 pages).
USPTO, Office Action Summary dated Oct. 6, 2010, in U.S. Appl. No. 11/510,357 (13 pages).
Applicant's Response to Office Action filed Apr. 6, 2011, in U.S. Appl. No. 11/510,357 (13 pages).
USPTO, Office Action Summary dated Jun. 23, 2011, in U.S. Appl. No. 11/510,357 (13 pages).
USPTO, Office Action Summary dated Oct. 5, 2009, in U.S. Appl. No. 11/926,849 (33 pages).

* cited by examiner

METHOD FOR TREATING MEAT PRODUCTS WITH CARBON MONOXIDE

CROSS-REFERENCE TO RELATED APPLICATION

This application is a continuation of U.S. patent application Ser. No. 10/795,000, filed Mar. 5, 2004, now U.S. Pat. No. 7,094,435 and entitled "Method and Apparatus for Treating Meat Products With Carbon Monoxide." The benefit of this prior application is hereby claimed in the present application pursuant to 35 U.S.C. §120. The entire content of this prior application is incorporated herein by this reference.

TECHNICAL FIELD OF THE INVENTION

This invention relates to meat processing operations and equipment. More particularly, the invention relates to methods and apparatus for treating meat products with carbon monoxide to obtain the benefits of carbon monoxide treatment, while avoiding the undesirable effects on coloration in the meat products.

BACKGROUND OF THE INVENTION

It has long been known that meat may be treated with carbon monoxide to maintain a color in the meat product. In particular, carbon monoxide treatment may produce a bright red color in the meat product. U.S. Pat. No. 4,522,835 to Woodruff et al. discloses a process of treating meat products with carbon monoxide to modify the color at the surface of the meat product.

It has also been proposed to use carbon monoxide as a preservative in meat products. U.S. Pat. No. 6,270,829 to Shaklai discloses a process where raw meat is saturated with carbon monoxide to inhibit microbial activity in the meat product. The Shaklai patent also discloses that the carbon monoxide saturation in the meat product produces a color change throughout the meat product.

The change in color from carbon monoxide treatment results from the reaction of carbon monoxide with hemoglobin and myoglobin in meat products to form carboxyhemoglobin and carboxymyoglobin respectively. The microbial activity inhibiting effect of carbon monoxide in meat products is at least in part produced by reducing the oxygen content in the meat product. This reduction in oxygen content creates an unsuitable environment for aerobic microbes. Carbon monoxide treatment may also inhibit the growth and propagation of anaerobic microbes as well.

Despite the benefits, there remain certain problems associated with treating meat products with carbon monoxide. One problem with treating uncooked meats with carbon monoxide is that the treatment may affect the color of the product after the meat begins to spoil and after cooking as well as before. In particular, prior art carbon monoxide treatments may leave the uncooked meat with a bright red color that remains in the meat even after it is cooked. This unnatural red color in the cooked meat product occurs throughout the product where the entire product is saturated with carbon monoxide. Even where only the surface of the meat product is saturated with carbon monoxide, the surface of the cooked meat product may have an unnatural red color and the meat may not brown properly. Thus, although the carbon monoxide treated, uncooked meat product may have an appearance that is desirable to consumers, the color in the uncooked meat product may mask spoilage and the color remaining in the cooked meat product may be unacceptable to consumers.

SUMMARY OF THE INVENTION

The present invention provides a method for treating meat products with carbon monoxide to obtain especially the microbe inhibiting benefits associated with carbon monoxide treatment while reducing or eliminating the problems associated with unnatural color in the uncooked and cooked meat product. The invention also encompasses apparatus for treating meat products with carbon monoxide. It is noted that the term "meat product" is used here and throughout this disclosure and the accompanying claims to refer to meat alone, including lean portions, fat, and related materials of beef, pork, poultry, or seafood, and to refer to meat that has been mixed with, or includes, additives such as flavorings, extenders, tenderizing agents, and other materials.

According to the invention, carbon monoxide is injected into the interior of the meat product along with other materials to produce a desired carbon monoxide saturation or content in the meat product. The amount of carbon monoxide in the added fluid is controlled to produce a desired carbon monoxide saturation level distributed substantially evenly throughout the volume of the meat product. This desired saturation level may vary depending upon the nature of the meat product being treated, however, the saturation level will generally remain at less than 100% or complete saturation for most meat products. The fluid added to the meat product may be added simultaneously with the carbon monoxide or may be added as a pre-treatment before application of carbon monoxide or as a post-treatment after the application of carbon monoxide. Regardless of the order in which the fluid is added in relation to the carbon monoxide, the added liquid or gas dilutes the carbon monoxide and helps facilitate the substantially even distribution of the carbon monoxide throughout the volume of the meat product. In preferred forms of the invention, the amount of carbon monoxide added to the meat product compared to the total volume of added fluid is equal to an amount of carbon monoxide to produce a desired carbon monoxide saturation level in the volume of the meat product being treated.

As used in this disclosure and the accompanying claims, complete or 100% carbon monoxide saturation in a meat product refers to the case where all of the available hemoglobin and myoglobin in meat product has been reacted with carbon monoxide to produce carboxyhemoglobin and carboxymyoglobin respectively. It will be noted that this does not necessarily mean that all hemoglobin and all myoglobin has been reacted since some hemoglobin and myoglobin in a meat product may reside in a state in which the reaction with carbon monoxide may not occur and may thus not be available to react with the carbon monoxide. Carbon monoxide saturation levels less than complete saturation may be described in this disclosure and the following claims as a percentage relative to complete saturation. For example, as used in this disclosure and the accompanying claims, 50% carbon monoxide saturation means that one-half of the available hemoglobin and myoglobin in the meat product has been converted to carboxyhemoglobin and carboxymyoglobin, respectively.

Carbon monoxide and added liquid is injected according to the invention through one or more injection conduits that are inserted into the meat product being treated. Meat products comprising relatively large cuts of meat may require a number of injection conduits inserted at spaced apart locations throughout the volume of the meat product to evenly distribute the carbon monoxide. Otherwise, a single injection conduit or relatively few injection conduits may be moved to various locations throughout the meat product to inject the carbon monoxide and added gas and/or liquid so as to produce the desired even carbon monoxide distribution.

Post-treatment according to the invention may include the application of a vacuum to draw off excess carbon monoxide from the meat product, both from the surface of the meat product and from the interior volume of the meat product. Alternatively or in addition to applying a vacuum, a flushing or rinsing fluid may be applied to the surface of the carbon monoxide treated meat product to remove excess carbon monoxide. This flushing or rinsing may remove excess carbon monoxide from the surface of the meat product and may also help remove unbound carbon monoxide from the interior of the meat product. After carbon monoxide treatment and any post-treatment, the treated meat product may be packaged or stored in a carbon dioxide atmosphere or other suitable atmosphere.

The invention claimed herein includes injecting a pH modifying material, especially ammonia based pH modifying materials such as ammonium hydroxide solution or ammonia gas. The pH modifying material may be injected as a pre-treatment fluid, post-treatment fluid or in a treatment mixture with the carbon monoxide. Also, different pH modifying materials may be injected at different points in the treatment process to either raise the pH or lower the pH of the meat product. Carbon monoxide treatment according to the invention is particularly beneficial when combined with pH modifying treatments because it believed that the carbon monoxide affects the manner in which pH modifying materials are absorbed into the meat products. In particular, it is believed that the carboxy forms of hemoglobin and myoglobin formed from carbon monoxide treatment does not allow certain constituents in the pH modifying material to be absorbed with the hemoglobin and myoglobin. These constituents of the pH modifying material are beneficially absorbed elsewhere in the meat product. It is also believed that when pH modifying material is used together with carbon monoxide, the pH modifying material may prevent the carbon monoxide from binding strongly with the meat product thereby reducing the effect of the carbon monoxide on the color of the meat product and/or making the color change less permanent. Thus, carbon monoxide treatments according to the present invention may produce the desired microbe inhibiting effect without unduly maintaining the red color in the treated product which might mask spoilage or affect the appearance of the cooked product.

These and other objects, advantages, and features of the invention will be apparent from the following description of the preferred embodiments, considered along with the accompanying drawings.

DESCRIPTION OF PREFERRED EMBODIMENTS

Figure 1:
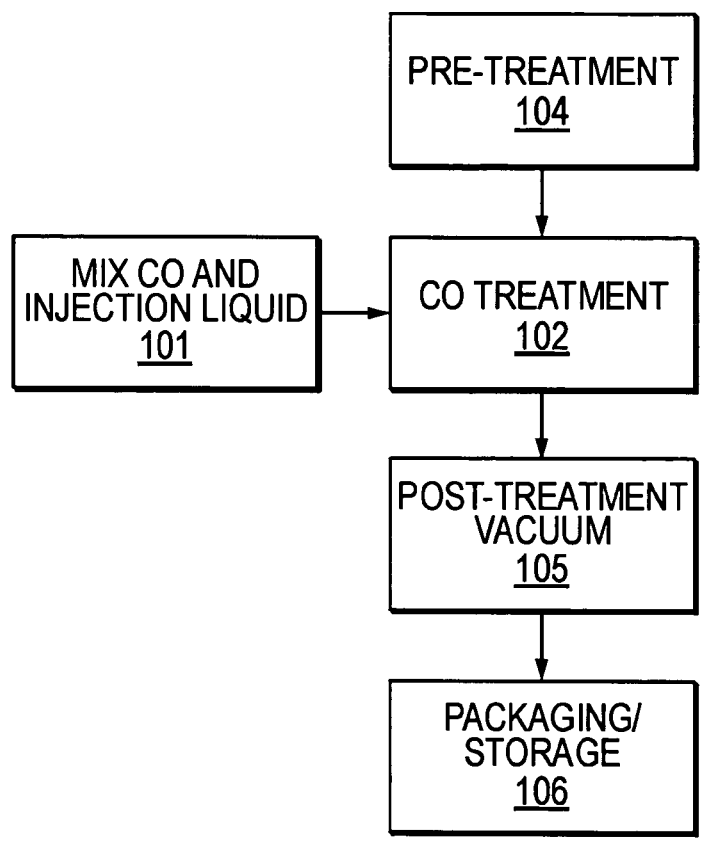
FIG. 1 is a block diagram illustrating the steps in preferred treatment methods embodying the present invention.

FIG. 1 will be used to describe various treatment methods within the scope of the invention. FIGS. 2 through 5 will be used to describe an apparatus that may be used to treat meat products according to the invention and further variations on the treatment methods shown in FIG. 1.

Referring to FIG. 1, a basic treatment process embodying the principles of the present invention includes mixing carbon monoxide and an injection liquid as shown at block 101 in FIG. 1, to produce a treatment mixture containing carbon monoxide. The process then includes injecting the treatment mixture into the volume of the meat product as indicated at process block 102 in FIG. 1. The manner in which the treatment mixture may be injected will be described below with reference to the apparatus shown in FIGS. 2 and 3 particularly. However, it will be appreciated that the treatment mixture and particularly the carbon monoxide is preferably distributed substantially evenly throughout the volume of the meat product to produce a desired carbon monoxide saturation level in the meat product. In order to produce the desired substantially even distribution of carbon monoxide throughout the volume of the meat product, the treatment mixture must generally be injected at a number of spaced apart locations throughout the volume of the meat product. As will be described with reference to FIGS. 2 and 3, this injection at different spaced apart locations may be performed using an array of injection conduits or a single injection conduit inserted at multiple locations in the volume of the meat product over a period of time.

The carbon monoxide in the treatment mixture formed at block 101 in FIG. 1 may be in solution in the injection liquid. Carbon monoxide may also be held in the treatment mixture as a gas suspended in the injection liquid or as a gas atomizing/vaporizing the injection liquid. Depending upon the particular injection liquid, carbon monoxide may be both in solution in the liquid and held as a suspended or atomizing gas.

The desired carbon monoxide saturation level in the treated meat product may vary with the nature of the meat product being treated. In some meat products, such as those that have or will have added seasonings, carbon monoxide saturation may approach 100% saturation. In lightly seasoned or unseasoned meat products, such as steaks for example, the desired carbon monoxide saturation according to the invention remains below 100% saturation, and preferably at approximately 95%. Carbon monoxide saturation levels at approximately 70%, 60%, 50%, and 40% may also be used according to the invention. Again, depending upon the meat product being treated, the desired carbon monoxide saturation level may range from approximately 5% to 95% saturation. It should also be noted that the desired carbon monoxide saturation level in the treated meat product may vary with the amount of liquid added to the meat product. For example, a meat product treated according to the invention with added liquid content at 20% by weight with the meat may allow a higher desired carbon monoxide saturation level than an added liquid content at 5% by weight with the meat. In any event, the carbon monoxide saturation level in the meat product treated according to the present invention should include a carbon monoxide saturation level or content low enough for the particular product to allow the meat product to brown properly.

The step of mixing carbon monoxide with injection liquid shown at block 101 in FIG. 1 may be accomplished in any suitable fashion for producing the desired treatment mixture. For example, carbon monoxide gas may be sparged into an injection liquid such as water using a suitable sparging device. A sparging device will be described with reference to FIG. 4 below. Alternatively, one or more positive displacement devices may be used to produce the desired proportion of carbon monoxide and injection liquid in a treatment mixture according to the present invention. An arrangement of positive displacement devices will be describe below with reference to FIG. 5. It should also be noted that although it is preferable to mix the carbon monoxide and injection liquid at a location near the equipment that will be used to inject the mixture, the mixing step shown at block 101 in FIG. 1 may be performed at a location far removed from the injection equipment, and the injection may be performed well after the carbon monoxide/injection liquid mixing step.

The process shown in FIG. 1 indicates that the present treatment method may include a pre-treatment step as shown at process block 104. It will be appreciated that no pre-treatment is required according to the invention. However, a pre-treatment step may be used to inject liquids such as water alone, brines, and/or pH modifying materials into the meat product to prepare the meat product for carbon monoxide treatment. In particular, injecting fluids in a pre-treatment step may reduce the amount of liquid that may be needed when injecting the carbon monoxide as shown at block 102. That is, part of the diluting liquid required to produce the desired carbon monoxide content in the meat product may be injected instead as a pre-treatment as shown at process block 104. This injection of pre-treatment liquid may open channels or fluid passages in the meat product that may help facilitate the distribution of carbon monoxide through the meat product in the treatment or injection step shown at process block 102.

FIG. 1 also shows a post-treatment step at process block 105. As with the pre-treatment step, the post-treatment step shown at process block 105 is not required in embodiments of the present invention. However, a post-treatment step may be used to inject additional liquids into the meat product including water, brines, or pH modifying materials. The liquids injected in any post-treatment step at process block 105 may further help dilute and distribute carbon monoxide in the meat product to help produce the desired carbon monoxide distribution. Process block 105 also indicates that a vacuum may be applied as part of a post-treatment step. A vacuum may be applied to the carbon monoxide treated meat product to draw off excess carbon monoxide from the surface of the meat product and from the interior of the meat product and thereby prevent over treatment in various areas of the product. Over treatment in the sense means any carbon monoxide saturation over the desired saturation level. In addition to or in lieu of applying a vacuum, a flushing liquid or gas may be directed over the surfaces of the carbon monoxide treated meat product to remove excess carbon monoxide from the surface and interior of the meat product and reduce the risk of over treatment.

The invention is not limited to any particular liquid for use as an injection liquid to mix with carbon monoxide to product the treatment mixture injected at process block 102, and is also not limited to any particular liquid injected in a pre-treatment step at block 104 or a post-treatment step at block 105. Also, pre-treatment and/or post-treatment may include the injection of one or more gases either alone or with a material in a liquid phase. Where pH modifying materials are injected in the pre-treatment and/or post-treatment step, or included in the treatment mixture, the preferred pH increasing materials are ammonia-based materials such as an ammonium hydroxide solution or ammonia gas. Preferred pH decreasing materials include carbonic acid solution or carbon dioxide gas. The resulting pH in the carbon monoxide treated product according to the present invention may range from 5.6 to 8.0 or higher. Good results have been produced where the carbon monoxide/pH treated meat product had a final pH of 6.5 to 6.7 as well as where the treated product had a pH of 7.4. The pH of an added liquid used to increase the pH of the meat product (such as an ammonium hydroxide solution) may range from 8.5 to 11.6 or more. It should also be noted that the desired pH of a pH increasing liquid may vary with the level of liquid added to the meat product according to the invention. For relatively low amounts of added liquid such as approximately 5% by weight with the meat, a pH of 8.5 in a pH increasing liquid comprising ammonium hydroxide, for example, may be more appropriate. For higher added liquid content, say 15% to 20% for example, a pH of 11.6 or more in the pH increasing liquid such as ammonium hydroxide solution may be more appropriate.

The treated meat product may be packaged as indicated at process block 106 in FIG. 1. In preferred forms of the invention, the carbon monoxide treated meat product is packaged in controlled-atmosphere tray packages under a suitable atmosphere. In particular, a carbon dioxide gas atmosphere is suitable for use in controlled-atmosphere packaging for carbon monoxide treated meat products according to the present invention. Other suitable atmospheres include inert gas atmospheres or mixtures of gases such as inert gases and carbon dioxide. It will be appreciated that rather than packaging the carbon monoxide treated meat products in controlled-atmosphere packages such as tray packages, the treated meat product may be stored in a suitable device under any suitable atmosphere, or may be packaged in a packaging container without an atmosphere such as a vacuum package.

In one particular form of the invention, a pre-treatment step shown such as that shown at process block 104 in FIG. 1 and/or a post-treatment step such as that shown at process block 105 includes injecting into the volume of a meat product a liquid such as water or ammonium hydroxide solution or other liquid with no carbon monoxide content. In this form of the invention, carbon monoxide may generally be injected at a higher concentration after the pre-treatment liquid injection or before the post-treatment liquid injection, or between pre and post-treatment injections. In particular, carbon monoxide may be injected in the form of a gas or a gas mixed with other gases. The gases in a mixture with carbon monoxide may help the carbon monoxide to distribute better in the volume of the meat product. Although any suitable carbon monoxide concentration may be used, carbon monoxide concentration in preferred injection gas mixtures may be as low as one-tenth of a percent (0.1%).

Where carbon monoxide is injected in a gas mixture, one preferred gas mixture includes oxygen in a suitable concentration. Oxygen may also be included with liquid treatment fluids in the form of suspended or dissolved oxygen gas or in the form of some other oxygenating material. Oxygen gas, dissolved oxygen, and any oxygenating material may each be referred to in this disclosure and the accompanying claims as an "oxygenating agent." It is believed that the materials added to the meat product such as a pH modifying material (ammonium hydroxide solution for example) interferes with the carbon monoxide binding with hemoglobin and myoglobin in the meat product so that the oxygen may compete better with the carbon monoxide to bind with these materials. Oxygen may be used in the present carbon monoxide treatment process to tie up hemoglobin and myoglobin in the meat thereby reducing the amount of hemoglobin and myoglobin available to react with carbon monoxide to produce the carboxy forms of the materials. Making some of the hemoglobin and myoglobin unavailable for the carbon monoxide may effectively increase the carbon monoxide saturation in a meat product that already includes some carbon monoxide saturation or decrease the amount of carbon monoxide needed to produce a desired saturation level. It is believed that using oxygen and/or other added materials such as pH modifying materials according to the invention to interfere with the binding of carbon monoxide with hemoglobin and myoglobin in the meat product allows the present carbon monoxide treated meat product to better show spoilage in the uncooked product and to produce a more natural appearance upon cooking.

One particular preferred form of treating meat products according to the invention includes injecting a treatment mixture made up of a compressed gas such as air, carbon monoxide gas, and pH modifying liquid (such as an ammonium hydroxide solution in water). This treatment material may be injected without any pre-treatment or post-treatment to provide the desired carbon monoxide saturation in the meat product without producing an unnatural color in the uncooked meat. The meat product treated in this fashion also browns substantially in the same way that an untreated meat product would brown during cooking.

A test was conducted using a treatment mixture made up of carbon monoxide gas and compressed and filtered air sparged into a liquid made up of an ammonium hydroxide solution having a pH of approximately 11.0. This treatment mixture was made up by pumping the ammonium hydroxide solution at approximately three (3) bar and injecting into this solution the compressed air and carbon monoxide. The compressed air was injected into the solution at approximately sixty-five (65) psi through a one-eighth (⅛) inch diameter and approximately one-half (½) inch long orifice. The compressed carbon monoxide gas was injected into the solution at approximately fifty-five (55) psi through four one-half inch long by 0.032 inch diameter orifices connected in series. In this test the resulting treatment mixture was injected through an injection apparatus including forty (40) injection needles, each with four 0.6 millimeter diameter injection openings. The injection was performed both on the downstroke into the meat product and on the upstroke. The meat product in the test was at approximately thirty-five (35) degrees Fahrenheit during treatment mixture injection and the injected treatment mixture was at approximately twenty-eight (28) degrees Fahrenheit. The injection resulted in a treated meat product having a weight 15% to 17% higher than the product before injection. The meat product, a New York strip cut into steaks, treated in this test developed a good red color within an hour of treatment and browned normally on cooking. The treated product exhibited essentially none of the tiger striping commonly associated with injected meats, and the cooked product had excellent flavor.

Another preferred form of the invention includes injecting a treatment mixture made up of carbon monoxide gas together with other gasses and without any liquid. This preferred form of the invention may or may not include a pre-treatment and/or a post-treatment step. It will be noted that this carbon monoxide gas mixture treatment according to the invention may not include adding any liquid to the meat product being treated. This form of the invention relies on gasses in the treatment mixture to help distribute carbon monoxide in the meat product and facilitate purging of any unbound carbon monoxide, particularly under a vacuum of short duration. One example of a gas mixture that may be employed according to this preferred form of the invention comprises a mixture made up of carbon monoxide gas, ammonia gas, and oxygen (or other diluting gasses). Other gasses may also be included in the mixture.

Some preferred forms of the invention may perform the pre-treatment and/or post-treatment steps in rapid succession with the carbon monoxide treatment step shown at block 102 in FIG. 1. Other preferred forms of the invention, however, may include a delay between a pre-treatment and the carbon monoxide application and/or between the carbon monoxide application and any post-treatment. The delay may be from one second to one hundred and twenty (120) seconds or more. It will be appreciated that a delay between treatment steps according to the invention may be sufficiently long to require the meat product to be moved out of an injection station (described below with reference to FIG. 3) to a holding area for at least a portion of the delay period, before proceeding on to the injection station for the next injection step.

Figure 2:
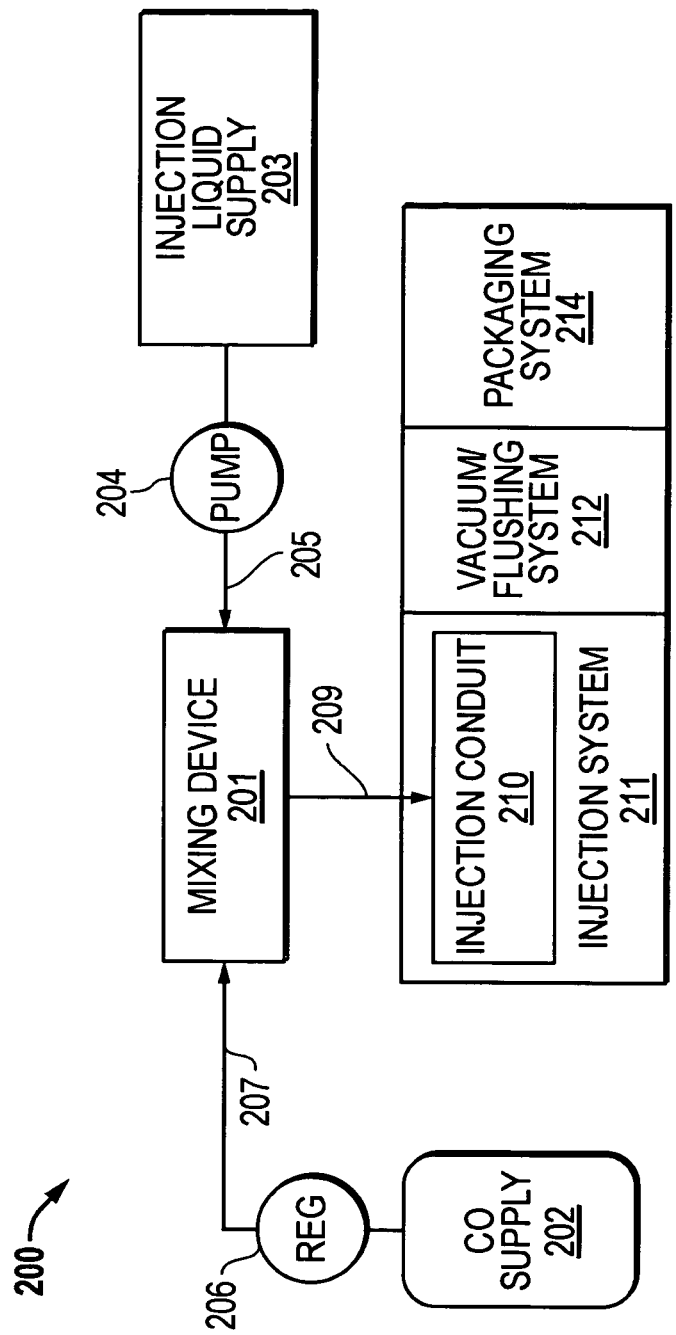
FIG. 2 is a diagrammatic representation of a system for treating meat products with carbon monoxide according to the present invention.

FIG. 2 shows a treatment system 200 that may be used to treat meat products with carbon monoxide according to the present invention. System 200 includes a mixing device 201 that receives carbon monoxide from a carbon monoxide supply 202 and receives injection liquid from an injection liquid supply 203. A suitable injection liquid may be water, brine, or ammonium hydroxide solution, for example, and may be pumped to mixing device 201 using a suitable pump 204 through a suitable connecting line 205. The carbon monoxide is supplied preferably in the form of a gas, and thus a suitable pressure regulator 206 is provided in the connecting line 207 which connects carbon monoxide supply 202 to mixing device 201.

Treatment mixture containing carbon monoxide (either in solution and/or as a suspended gas) and the injection liquid is delivered through a suitable connecting line 209 to one or more injection conduits 210. Injection conduits 210 make up part of an injection system 211 that will be described further below with reference to FIG. 3. In addition to the injection system 211, treatment system 200 shown in FIG. 2 further includes a vacuum and/or flushing arrangement 212 for applying a vacuum to the carbon monoxide treated meat product and/or flushing or rinsing the carbon monoxide treated meat product with a suitable flushing/rinsing fluid. Finally, system 200 includes a packaging system shown diagrammatically at reference numeral 214. Packaging system 214 may comprise any suitable packaging system such as a tray-type, controlled-atmosphere packaging system or a vacuum packaging system. It will be appreciated that there may be a storage facility interposed between injection system 211 and packaging system 214. Any storage of the carbon monoxide treated meat is preferably done under a controlled atmosphere at a suitable storage temperature.

There may be a benefit to allowing a certain minimum amount of time to elapse between the injection treatment according to the invention and the time that the treated product is consumed. It is believed that the storage time allows the added materials to better distribute and equilibrate through the meat product. For example, a meat product may preferably be stored a minimum of 24 hours after treatment before it is cooked and consumed. Storage of 4 to 6 days or more may also be beneficial. The storage may be in a package or in a storage facility under any suitable storage conditions. Also, it will be appreciated that the storage prior to consumption may be at any location, including in distribution channels from the injection treatment facility to the consumer (for example, in transit to retail or wholesale distributors or at retail or wholesale storage facilities or product displays).

An injection conduit 210 used to inject carbon monoxide and other materials into the volume of a meat product according to the present invention may include any suitable conduit or needle suitable for penetrating the surface of the meat product so that the desired carbon monoxide treatment mixture and any other treatment material may be injected into the volume of the meat product. Preferred forms of the invention utilize elongated injection conduits with a sharp distal end for piercing the surface of the meat product and preferably a number of injection passages spaced apart along the length of the injection conduit that penetrates into the interior of the meat product. Rather than discrete injection openings, one or more areas of porous and permeable material such as a plastic, ceramic, or cintered metal may be included along the length of the injection conduit 210 to provide one or more areas through which the treatment mixture may flow from the conduit into the volume of the meat product being treated. Some forms of the invention may include injection conduits that include porous and permeable material along their entire length with an axial passage extending there through and with a solid distal portion to provide a sharp tip. Still other forms of the invention may include injection conduits of different lengths and with injection flow passages positioned at different penetration depths in the volume of the meat product. These and any other suitable arrangement of injection conduits may be used to distribute the carbon monoxide treatment mixture and other liquids or fluids into the volume of the meat product to ensure the desired carbon monoxide treatment and distribution according to the present invention.

It will be appreciated by those skilled in the art that the diagrammatic representation of FIG. 2 does not show numerous components that may be included in system 200. For example, connecting lines 205, 207, and 209 may include numerous fittings and components such as check valves or filters. Vacuum/flushing system 212 and packaging system 214 may in fact each comprise a complicated system, although the details of these types of systems are well known in the field of meat or food processing. Details on these types of components are unnecessary for an understanding of the present invention that would allow one skilled in the art to practice the invention, and thus these details are omitted from FIG. 2 so as not to obscure the invention in unnecessary detail.

Figure 3:
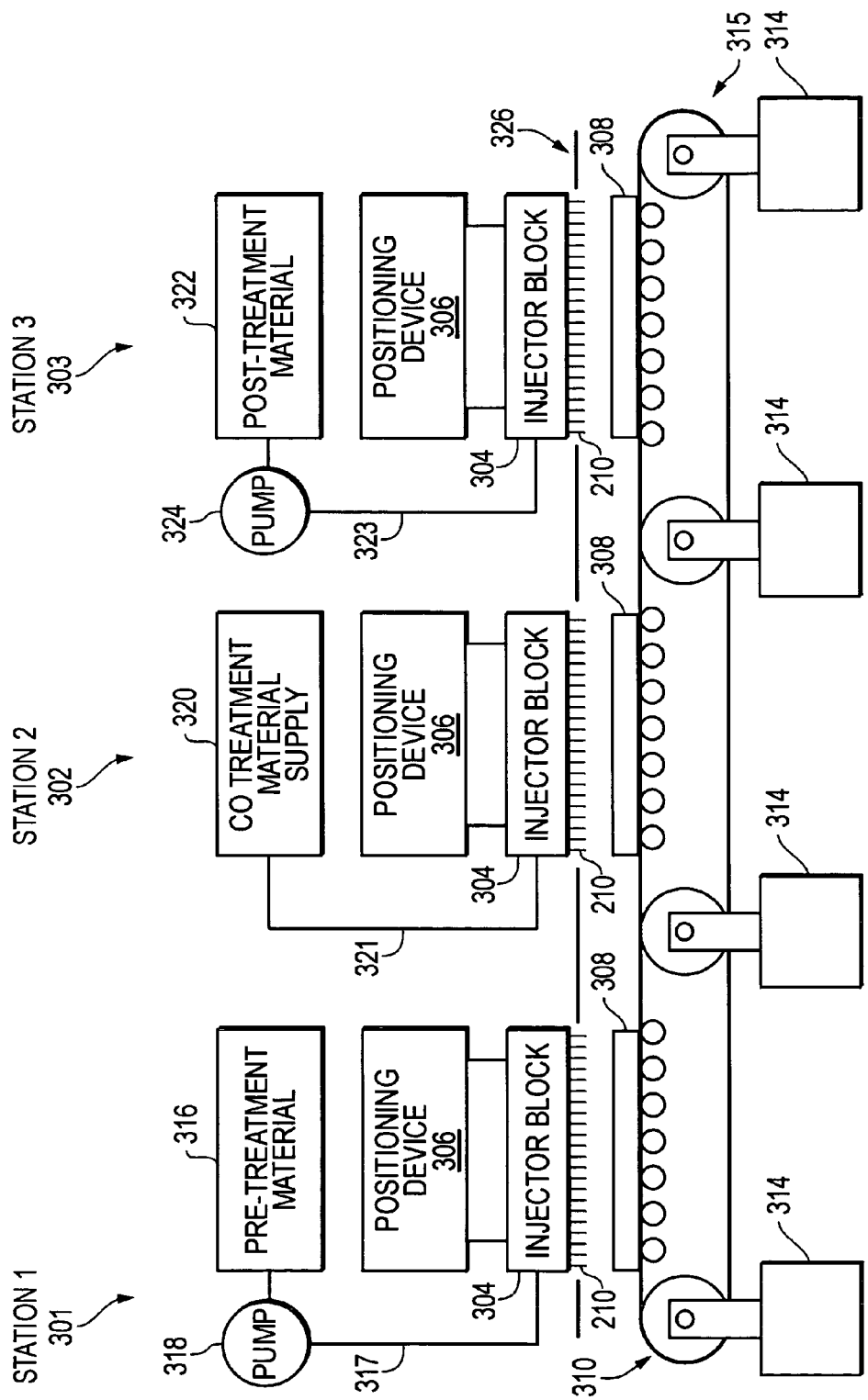
FIG. 3 is a diagrammatic representation of an injection system that may be used in the treatment system shown in FIG. 2.

FIG. 3 provides a diagrammatic illustration of an injection system that may be employed as injection system 211 shown in FIG. 2. Injection system 211 shown in FIG. 3 includes three separate stations for injecting fluids or liquids into a meat product. A first station is shown generally at reference 301, a second station is shown at 302, and a third station is shown at 303. Each station includes an injector block 304 preferably supporting a large number of spaced apart injection conduits 210. Injector block 304 not only serves as a support for the injection conduits 210 but also may serve as a manifold for distributing the desired material from an injector block inlet to the various injection conduits associated with the respective injector block. Each injector block 304 is shown operatively connected with a respective positioning device 306. Each respective positioning device 306 is adapted to move the respective injector block 304, and thus the respective injection conduits 210, relative to a meat product to be treated. In particular, once a meat product such as a product shown at 308 in FIG. 3 is in position for a respective station, the respective positioning device 306 may push the injector block 304 downwardly so that the associated injection conduits 210 penetrate into the volume of the meat product to a desired injection position. From this injection position, the desired treatment fluid may be injected into the volume of the meat product 308 through the injection conduits. Once a desired volume of liquid has been injected, the respective positioning device 306 may raise its associated injector block 304 to withdraw the respective injection conduits 210 from the meat product 308.

Injection system 211 shown in FIG. 3 includes a meat product support and positioning arrangement shown generally at reference numeral 310. Support and positioning arrangement 310 includes a conveyor 315 for conveying meat products 308 into the system, from station to station in the system, and finally out of the system to a subsequent processing stage such as a vacuum/flushing system or a packaging system. In addition to or in lieu of the positioning device 306 associated with each station, injection system 211 may include a meat product support positioning arrangement including actuating devices 314 that may be operated to move the meat product support and thus the meat product 308 in relation to the various injector blocks 304 and injection conduits 210.

Each treatment station 301, 302, and 303 shown in FIG. 3 is associated with a separate treatment material supply connected through a suitable conduit to the respective injector block 304. In particular, FIG. 3 shows a pre-treatment material supply 316 connected to the injector block 304 associated with station 301, through connecting conduit 317. A pump 318 is shown in the conduit 317 for supplying the pre-treatment material at a suitable injection pressure. A carbon monoxide treatment material or mixture supply 320 is shown associated with the second station 302 and connected through a suitable conduit 321 to supply the carbon monoxide treatment material/mixture to the respective injector block 304 at a suitable injection pressure. This carbon monoxide treatment material/mixture supply 320 may, for example, correspond to the arrangement of mixing device 201, and material supplies 202 and 203 shown in FIG. 2. Finally, a post-treatment material supply 322 is shown associated with the third station 303 together with connecting conduit 323 and pump 324 to provide the material under a suitable injection pressure.

The injection pressures suitable for use in injecting carbon monoxide treatment material, pre-treatment, and post-treatment material according to the present invention generally coincide with those pressures used for injecting brines into meat products as known in the prior art. The injection pressure may vary depending upon the temperature and nature of the meat being treated, the size of injection conduits employed and the exit openings in the injection conduits, and the amount of material to be added to the meat product. For beef steaks at 35 degrees Fahrenheit, for example, 2.5 bars is a suitable pressure for injecting material to produce a content of added material at 10% by weight with the meat, and 3.5 bars is a suitable pressure for injecting material to produce a content of added material at 20% by weight with the meat.

It will be appreciated that the meat product 308 being treated in injection system 211 shown in FIG. 3 may need to be refrigerated in the injection system to maintain suitable temperature conditions in the meat product. FIG. 3 shows an insulating barrier 326 above the meat product supporting arrangement 310 and below the injector blocks 304. Injection conduits 211 traverse the plane of the insulating barrier 326 through suitable openings to reach the meat products 308. The insulating barrier material may simply terminate in the area of each injector block 304 or may include openings through which the individual injection conduits may extend to reach the meat products 308 to be treated. Injection system 211 may also have associated with it a suitable refrigeration arrangement for cooling material in the area between the barrier 326 and the meat product support surface.

It will be appreciated that the invention encompasses numerous variations on the injection system shown for example in FIG. 3. For example, a suitable injection system may include only a single injection station rather than the three separate stations shown in FIG. 3. Even in a single station embodiment, different material supplies may be connected to the single injector block 304 so that different materials including the carbon monoxide treatment mixture and any pre-treatment or post-treatment materials may be injected into the meat products 308 through the single injector block 304 and associated injection conduits 210. Furthermore, it is possible according to the present invention to use only a limited number of injection conduits 210 or even only a single injection conduit. When using a limited number of injection conduits 210 or a single injection conduit for a relatively large meat product, each injection conduit is preferably inserted at one point to inject the desired material and then withdrawn and inserted at another point for injecting the material at that point. This process may be repeated at different locations across the meat product to provide the desired even carbon monoxide distribution throughout the volume of the meat product.

In preferred forms of the invention, the different injection points for the carbon monoxide treatment material or mixture and for the pre-treatment and post-treatment materials are separated by approximately one-eighth (⅛) of an inch to one (1) inch across the meat product being treated. That is, in a multiple injection conduit arrangements where the injection conduits are inserted once to inject the desired material, the various injection conduits may be separated and spaced apart on approximately one-eighth (⅛) of an inch to one (1) inch centers. Where injection conduits are inserted at different points to provide the desired injection coverage, the different insertion points are also spaced apart between one-eighth (⅛) of an inch to one (1) inch. Any suitable needle or injection conduit may be used in the present invention. The outer diameter of preferred needles or injection conduits may range from 2 to 6 millimeters or more. It will be appreciated that the spacing of injection conduits, the size of the conduits, and suitable injection pressures may vary with the nature of the meat product being treated.

Figure 4:
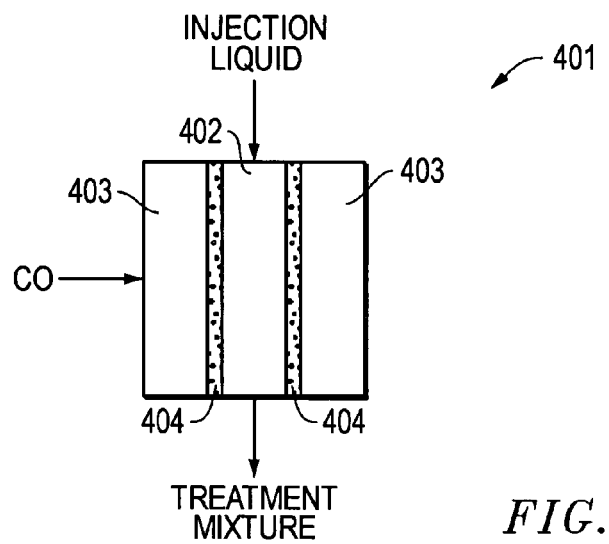
FIG. 4 is a diagrammatic representation of a preferred device for mixing carbon monoxide and an injection liquid to produce a treatment mixture.
Figure 5:
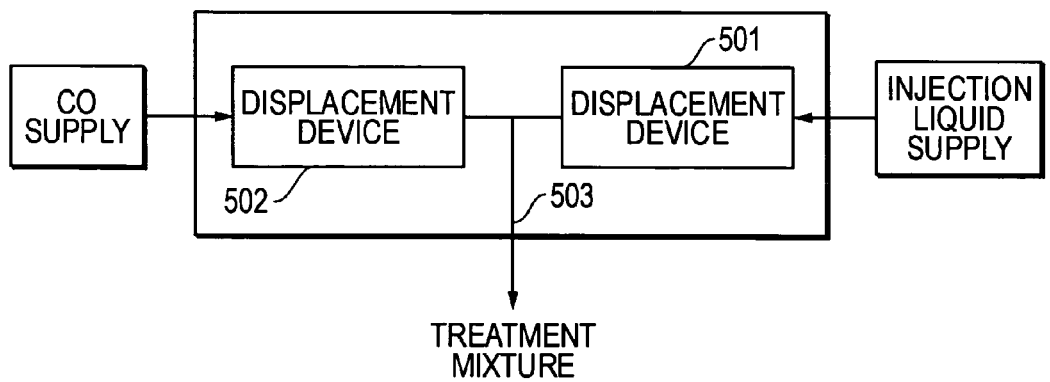
FIG. 5 is a diagrammatic representation of an alternate arrangement for mixing carbon monoxide and an injection liquid to produce a desired treatment mixture.

FIGS. 4 and 5 show alternate mixing devices (see 201 in FIG. 2) that may be used to produce a treatment mixture of carbon monoxide and a suitable injection liquid. Referring first to FIG. 4, a sparging device 401 may be connected to an injection liquid supply into a supply of carbon monoxide gas. The injection liquid may be directed through a contact passage 402 associated with the sparging device while the carbon monoxide gas may be directed into the sparging device into a chamber 403. Chamber 403 is separated from contact passage 402 by a suitable permeable barrier 404 including contact openings (not shown) through which the carbon monoxide may pass into the injection liquid passing through passage 402. The contact openings (not shown) may comprise perforations or may be associated with a porous and permeable material such as a cintered metal or ceramic material from which the permeable barrier is formed. The carbon monoxide gas pressure and injection liquid flow rate may be controlled through the sparging device so that a desired amount of carbon monoxide is introduced into the injection liquid to produce the treatment mixture having the desired volume and carbon monoxide content.

An alternate mixing device shown in FIG. 5 arrangement includes two positive displacement devices 501 and 502 such as piston and cylinder arrangements. Displacement device 501 receives injection liquid from the injection liquid supply while displacement device 502 receives carbon monoxide gas from the carbon monoxide supply. Controlled volumes of carbon monoxide gas and injection liquid may be displaced into a common exit conduit 503 to produce the desired treatment mixture having the desired concentration of carbon monoxide.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be closed or semi-closed transitional phrases, as set forth, with respect to claims, in the United States Patent Office Manual of Patent Examining Procedures (Eighth Edition, August 2001 as revised May 2004), Section 2111.03.

Any use of ordinal terms such as "first," "second," "third," etc., in the claims to modify a claim element does not by itself connote any priority, precedence, or order of one claim element over another or the temporal order in which acts of a method are performed. Such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A method including:
   (a) injecting a treatment mixture into an interior volume of a meat product at an injection location, the treatment mixture including carbon monoxide and an injection fluid and being injected into the volume of the meat product through an injection conduit inserted into the volume of the meat product, wherein the meat product comprises an uncooked cut of meat, and wherein the carbon monoxide in the treatment mixture is in solution such that the treatment mixture includes no gaseous phase carbon monoxide; and
   (b) injecting a pre-treatment fluid into the volume of the meat product prior to injecting the treatment mixture, the pre-treatment fluid including a pH modifying material and being injected into the volume of the meat product through the injection conduit or an additional injection conduit inserted into the volume of the meat product.

2. The method of claim 1 wherein the pH modifying material includes carbon dioxide gas or carbonic acid solution.

3. The method of claim 1 wherein the pH modifying material includes an ammonia-based pH increasing material.

4. The method of claim 3 wherein the pH of the meat product after injection of the treatment mixture and pretreatment fluid is 5.6 or higher.

5. The method of claim 3 wherein the ammonia-based pH increasing material includes ammonia gas.

6. The method of claim 3 wherein the ammonia-based pH increasing material includes an ammonium hydroxide solution.

7. The method of claim 6 wherein the ammonium hydroxide solution has a pH of 8.5 or higher.

8. A method including:
(a) injecting a treatment mixture into an interior volume of a meat product at an injection location, the treatment mixture containing carbon monoxide and an injection fluid and being injected into the volume of the meat product through an injection conduit inserted into the volume of the meat product, wherein the meat product comprises an uncooked cut of meat, and wherein the carbon monoxide in the treatment mixture is in solution such that the treatment mixture includes no gaseous phase carbon monoxide; and
(b) injecting a post-treatment fluid into the volume of the meat product after injecting the treatment mixture, the post-treatment fluid including a pH modifying material and being injected into the volume of the meat product through the injection conduit or an additional injection conduit inserted into the volume of the meat product.

9. The method of claim 8 wherein the pH modifying material includes carbon dioxide gas or carbonic acid solution.

10. The method of claim 8 wherein the pH modifying material includes an ammonia-based pH increasing material.

11. The method of claim 10 wherein the pH of the meat product after injection of the treatment mixture and post-treatment fluid is 5.6 or higher.

12. The method of claim 10 wherein the ammonia-based pH increasing material includes ammonia gas.

13. The method of claim 10 wherein the ammonia-based pH increasing material includes an ammonium hydroxide solution.

14. The method of claim 13 wherein the ammonium hydroxide solution has a pH of 8.5 or higher.

15. A method including:
(a) injecting carbon monoxide into an interior volume of a meat product at an injection location, the carbon monoxide being injected into the volume of the meat product through an injection conduit inserted into the volume of the meat product, wherein the meat product comprises an uncooked cut of meat, and wherein the injected carbon monoxide is in solution in a carrier liquid with no gaseous phase carbon monoxide in the carrier liquid; and
(b) injecting a pH modifying material into the volume of the meat product simultaneously with injecting the carbon monoxide, the pH modifying material comprising an ammonia-based pH increasing material and being injected into the volume of the meat product through the injection conduit or an additional injection conduit inserted into the volume of the meat product.

16. The method of claim 15 wherein the pH of the meat product after injection of the carbon monoxide and pH modifying material is 5.6 or higher.

17. The method of claim 15 wherein the ammonia-based pH increasing material includes ammonia gas.

18. The method of claim 15 wherein the ammonia-based pH increasing material includes an ammonium hydroxide solution.

19. The method of claim 18 wherein the ammonium hydroxide solution has a pH of 8.5 or higher.

* * * * *